No. 831,451. PATENTED SEPT. 18, 1906.
C. E. MANDELICK.
SYSTEM OF MOTOR CONTROL.
APPLICATION FILED DEC. 19, 1905.
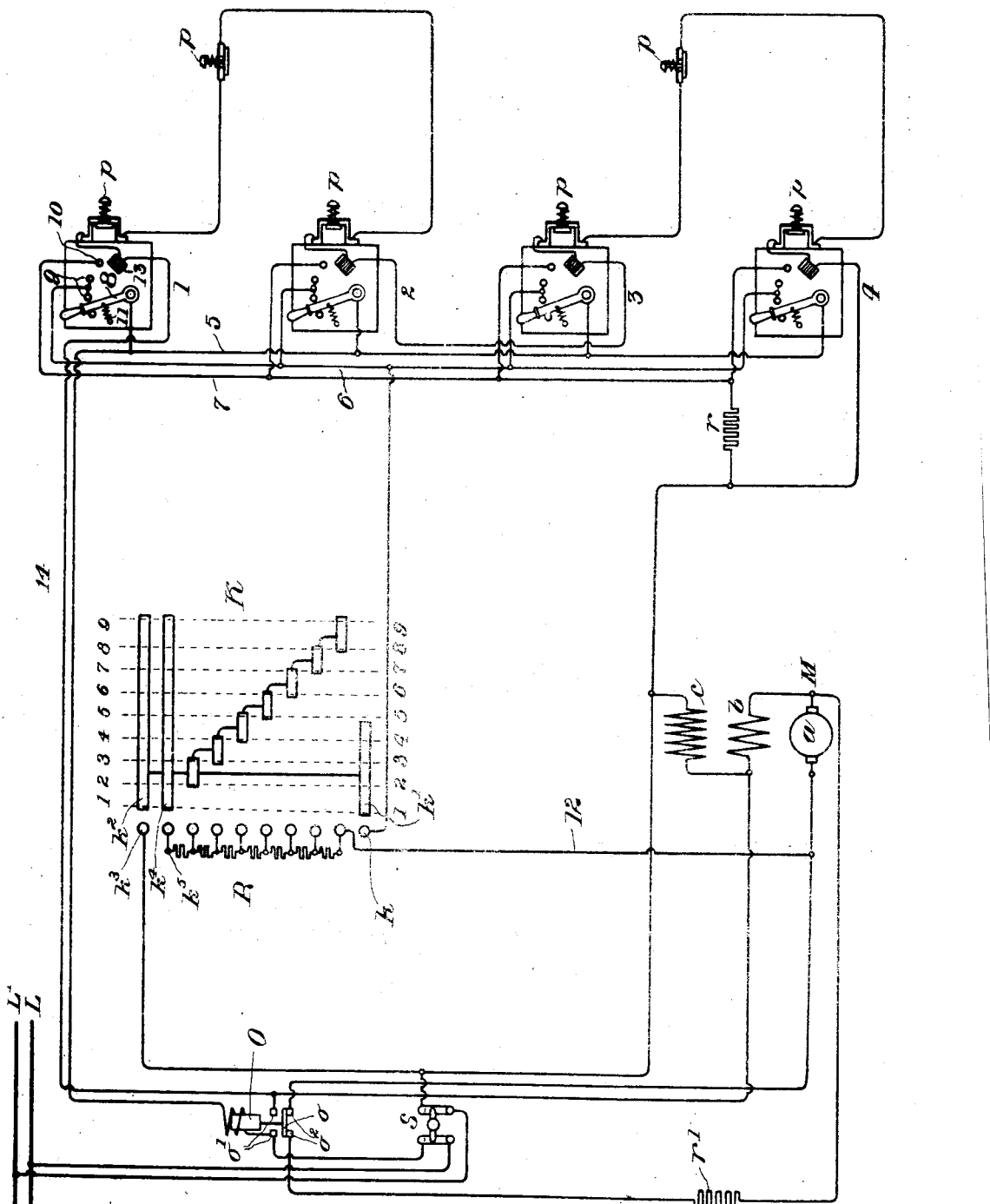
Witnesses:
M. G. Crozier
Helen Orford
Inventor:
Charles E. Mandelick,
by Albert G. Davis
Atty

UNITED STATES PATENT OFFICE.

CHARLES E. MANDELICK, OF NEW YORK, N. Y., ASSIGNOR TO SPRAGUE ELECTRIC COMPANY, A CORPORATION OF NEW JERSEY.

SYSTEM OF MOTOR CONTROL.

No. 831,451.  Specification of Letters Patent.  Patented Sept. 18, 1906.

Application filed December 19, 1905. Serial No. 292,408.

*To all whom it may concern:*

Be it known that I, CHARLES E. MANDELICK, a citizen of the United States, residing at New York, county of New York, State of New York, have invented certain new and useful Improvements in Systems of Motor Control, of which the following is a specification.

The present invention relates to motor-control systems wherein it is desired to be able to start and stop the motor or motors from any one of a plurality of stations without disturbing the main controller after it has been brought into a running position; and the present invention has for its object a novel construction and arrangement of parts to be hereinafter described, and particularly pointed out in the claims.

The invention is illustrated diagrammatically in the accompanying drawing.

Reference being had to the drawing, M represents a motor having an armature $a$, a series field-winding $b$, and a shunt field-winding $c$.

K is a controller adapted to connect the motor to a source of current-supply (indicated by lines L L') and to control the speed of the motor by varying the amount of the resistance R, which is included in the armature-circuit. The motor and controller may take other forms than those illustrated since the present invention is not limited to any particular form of motor or controller.

O is a relay having a movable contact member $o$ arranged when the relay is energized to bridge contacts $o'$, and thereby connect one terminal of the motor to line L and when the relay is deënergized to bridge contact $o^2$, and thereby short-circuit the armature through a braking resistance $r'$.

Usually there are only a few stations from which it is necessary to be able to start and stop the motor or motors at will; but it is highly desirable to have a comparatively large number of points from which the motor or motors may be brought to rest, so that no time need be lost in reaching a switch in case of emergency. Thus in control systems for rotary web-printing presses, for example, it should be possible to control the motor or motors from a few stations in order to operate the machine at a low speed and start and stop it while the proper adjustments are being made. While simple spring-actuated push-buttons answer all the requirements for a stop-switch, a combined stopping and starting switch should be so arranged that the operator has perfect control over the machine to stop and start it at will and still maintain the free use of his hands for making the required adjustments. By using the combined starting and stopping switches at all points from which it is desirable to stop the machine the expense of the apparatus is unnecessarily increased, while if stopping and starting switches are employed only at the stations from which adjustments are effected the efficiency of the system is impaired. In my present system I so construct and arrange the parts that switches adapted to perform all the necessary functions, and only those functions, are employed, so that the combined starting and stopping switches may be as elaborate as may be desirable and as many stopping-points provided about the machine as may seem advantageous without incurring needless expense or decreasing the efficiency to the system. To this end I have provided a number of combined starting and stopping station-switches, together with a separate set of push-button switches from which the station-switches may be controlled in order to stop the motor. In the drawing four such station-switches 1, 2, 3, and 4 are shown; but of course the number of these switches depends upon the number of points from which it is desirable to start and stop the motor without moving the main controller. The station-switches control the relay O and are in turn controlled by a series of push-buttons $p$. The station-switches are all alike, so that a description of one will suffice for all. Referring to station-switch 1, it will be seen that the arm 8 is permanently connected to wire 5, while twin contacts 9 are connected to wire 6 and contact 10 to wire 7. Normally the switch-arm is maintained in the position shown by means of the spring 11. When the arm 8 is moved into engagement with either of contacts 9, wires 5 and 6 are connected together, while upon moving the arm into engagement with contact 10 wires 5 and 7 are joined. 13 is an electromagnet adapted to hold the switch-arm in engagement with contact 10 against the tension of the spring 11. The coils of the several electromagnets are in series with each other and the push-buttons $p$.

When the main controller is moved into one of its operative positions—namely, when the row of fixed contacts engages with the movable contacts along line 1 1—a circuit may be traced from line L through one arm of switch S, through the actuating-coil of the relay C, and thence to wire 5, and if any station-switch has been moved, so as to complete circuit at contact 9, then through such station-switch to wire 6, and thence through contacts $k, k', k^2$, and $k^3$, through switch S to the other side of the line L'. This circuit is the actuating-circuit for the relay, and therefore it is seen that by moving any one of the station-switches into the proper position the relay may be actuated so long as contacts $k$ $k'$ on the controller remain in engagement, preferably during the low-running positions, in which the motor is protected by considerable resistance. If the arm of the station-switch is brought into engagement with contact 10 instead of contact 9, a circuit in shunt to the controller is established from wire 5 to wire 7 and thence through resistance $r$, through switch S, as before, back to the line. This latter circuit is the maintaining-circuit for the relay; but by reason of resistance $r$ the current in this circuit is at no time sufficient to operate the relay, but only great enough to maintain it after it has been operated through the energization of the actuating-circuit.

The operation is as follows: Assuming that the controller has been moved into its first running position and the station-switch 1 has been operated so as to bring arm 8 into engagement with contacts 9, the actuating-circuit for the relay will be completed and the relay will operate to bridge contacts $o'$, thereby completing a circuit to the motor from line L through switch S, contacts $o'$, shunt-field $c$, and back to line L' through switch S. Another circuit passes from contacts $o'$ through the series field $b$, through the armature $a$, wire 12, resistance R, controller-contacts $k^5$, $k^4$, $k^2$, and $k^3$, through switch S to line L'. As long as the controller is in one of its first four positions the handle of the station-switch may be released to cause the motor-circuit to be interrupted without making it necessary to operate the controller to again start the motor; but if the controller has been moved past its fourth position then upon release of the handle of the station-switch it becomes impossible to actuate the relay again until the controller is returned to one of its first four positions. At any time when the operator desires to let go of the handle of the station-switch without opening the motor-circuit he may throw the handle into the final position—namely, that position wherein the arm 8 engages with contact 10—and the maintaining-circuit for the relay is established. The arm is now held against the tension of the spring 11 by electromagnet 13, which is included in the following circuit: line L, through switch S, upper relay-contacts, wire 14, and thence through the actuating-coil of electromagnet 13, through push-buttons $p$, and the actuating-coils of similar electromagnets on the other stations, through switch S to line L'. It is evident that as long as push-buttons $p$ remain closed the station-switch will be held in its relay-maintaining position, and the controller may be operated to vary the speed of the motor without effecting the station-switch, unless the controller is moved into its "off" position. If at any time it is desired to stop the motor, either from a point adjacent the station-switch or from some other point, the nearest push-button is pressed and the circuit of electromagnet 13 is interrupted. As soon as the electromagnet is deënergized the movable member of the switch flies into its inoperative position, the relay is deënergized, and the motor-armature is short-circuited upon itself. Thus the motor may be started and stopped from any one of several station-switches at the will of the operator and may be stopped from any point by simply pressing one of the push-buttons.

What I claim as new, and desire to secure by Letters Patent of the United States, is—

1. In a system of motor control, a motor-circuit, a controller and a relay for governing said motor-circuit, a control-circuit for said relay, a station-switch coöperating with said control-circuit to maintain said relay normally in its open position and to hold said relay closed when the station-switch is moved into a running position, an electromagnet for holding said station-switch in said running position, and a switch for controlling said electromagnet.

2. In a system of motor control, a motor-circuit, a controller and a relay for governing said motor-circuit, a control-circuit for said relay, a normally open station-switch in said control-circuit, an electromagnet for holding said station-switch closed, and a switch for controlling said electromagnet.

3. In a system of motor control, a motor-circuit, a controller and a relay for governing said motor-circuit, actuating and maintaining circuits for said relay, contacts on said controller arranged to interrupt said actuating-circuit in certain positions of said controller, a normally open station-switch arranged to close either the said actuating or the said maintaining circuit, an electromagnet for holding said station-switch in maintaining-circuit-closing position, and a switch for controlling said electromagnet.

4. In a system of motor control, a motor-circuit, a speed-controller and a relay for governing the motor-circuit, an actuating-circuit and a maintaining-circuit for said relay, contacts associated with said speed-controller and arranged to interrupt said actuating-circuit when the controller passes beyond its low-running positions, a station-switch having contacts in said actuating and in said maintaining circuits, a spring for holding the station-switch open, an electromagnet for holding the station-switch in position to complete the maintaining-circuit, a control-circuit for said electromagnet, and a plurality of switches in said control-circuit.

5. In a system of motor control, a motor-circuit, a relay for governing said motor-circuit, a plurality of station-switches connected in parallel to said relay for controlling the same, a control-circuit for said station-switches, and a plurality of switches connected in series in said control-circuit.

6. In a system of motor control, a motor-circuit, a relay for governing said motor-circuit, a plurality of parallel control-circuits for said relay, a station-switch in each of said control-circuits, electromagnetic controlling means for said station-switches, and a plurality of switches for governing said electromagnetic controlling means.

7. In a system of motor control, a motor-circuit, a relay for governing said motor-circuit, a plurality of normally open station-switches connected in parallel for controlling said relay, electromagnets for holding said switches closed, and switches for controlling said electromagnets.

8. In a system of motor control, a motor-circuit, a relay for governing said motor-circuit, a plurality of station-switches for controlling said relay, a controlling-circuit for said station-switches, and switches arranged in said controlling-circuit.

9. In a system of motor control, a motor-circuit, a motor-controller and a relay for governing said motor-circuit, actuating and maintaining circuits for said relay, contacts associated with said controller and adapted to interrupt the said actuating-circuit in certain positions of the controller, a plurality of station-switches arranged in parallel with each other and having contacts in said actuating and said maintaining circuits, electromagnetic controlling means for said station-switches and switches for governing said electromagnetic controlling means.

10. In a system of motor control, a motor-circuit, a speed-controller and a relay for governing said motor-circuit, actuating and maintaining circuits for said relay, contacts associated with said controller and adapted to interrupt said actuating-circuit in the high-speed running positions of said controller, a plurality of normally open station-switches connected in parallel to said actuating and said maintaining circuits, electromagnets arranged to hold said station-switches in positions to complete said maintaining-circuits, and switches for controlling said electromagnets.

In witness whereof I have hereunto set my hand this 14th day of December, 1905.

CHARLES E. MANDELICK.

Witnesses:
H. F. COSGROVE,
E. P. HOPKINS.